Figure 1:
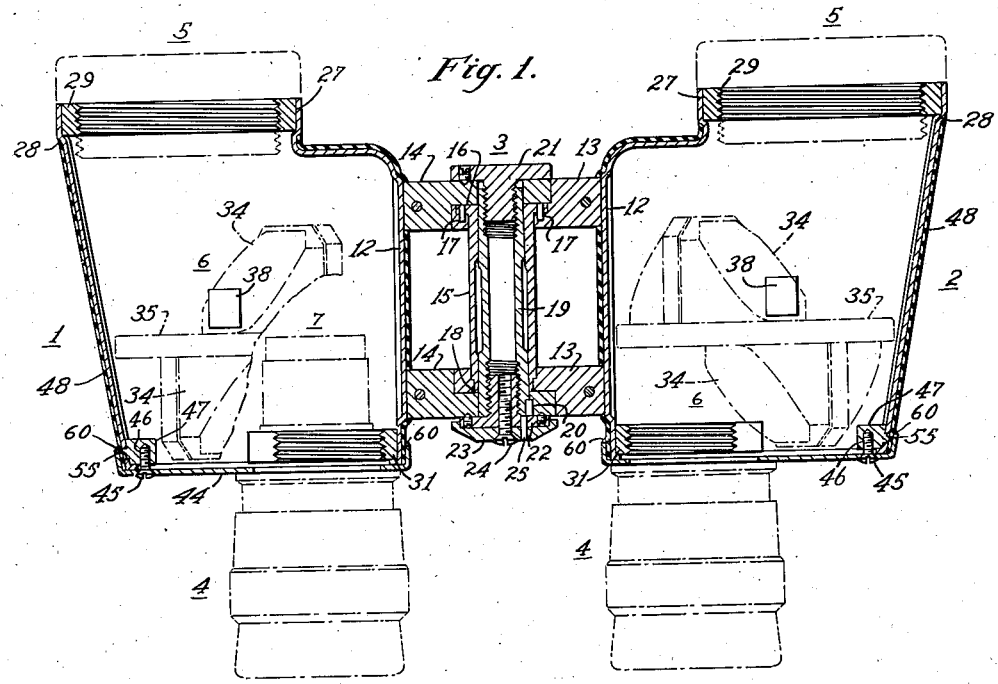

Jan. 22, 1946.   W. J. RUSSELL   2,393,339
BINOCULARS
Filed Aug. 25, 1943   2 Sheets-Sheet 1

WITNESSES:
Edward Michaels
E. F. Oberheim

INVENTOR
William J. Russell.
BY
Paul E. Friedemann
ATTORNEY

Jan. 22, 1946.  W. J. RUSSELL.  2,393,339
BINOCULARS
Filed Aug. 25, 1943  2 Sheets-Sheet 2
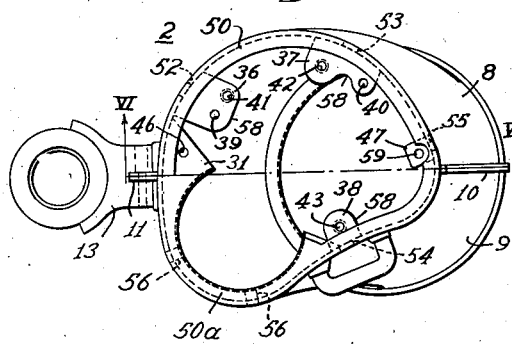
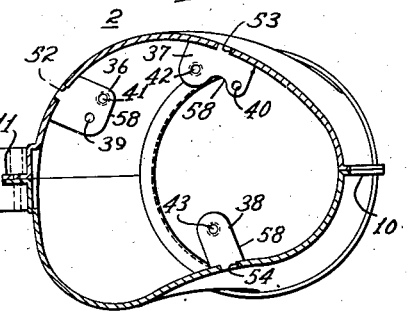
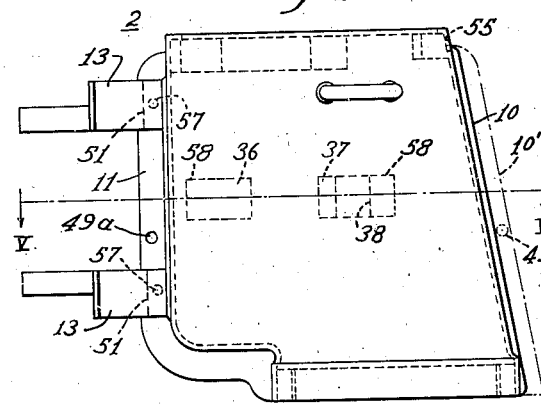
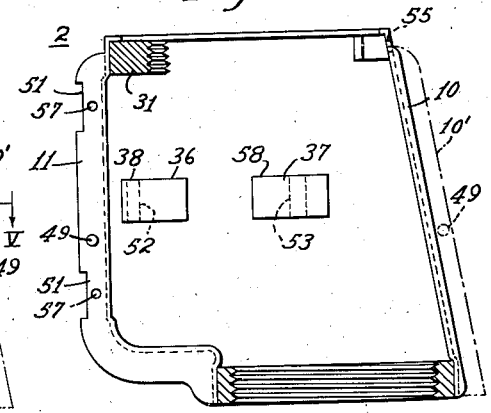
WITNESSES:
Edward Michaels
E. F. Oberheim
INVENTOR
William J. Russell.
BY
Paul E. Friedemann
ATTORNEY Patented Jan. 22, 1946

2,393,339

UNITED STATES PATENT OFFICE 2,393,339

BINOCULARS

William J. Russell, New Britain, Conn., assignor to Westinghouse Electric Corporation, East Pittsburgh, Pa., a corporation of Pennsylvania Application August 25, 1943, Serial No. 499,902

7 Claims. (Cl. 88—34)

The present invention relates generally to optical instruments and more particularly to the body or barrels of such instruments in which the system of lenses are mounted.

The specific disclosure hereinafter made is directed to a binocular as an article of manufacture. It will become apparent, however, to one skilled in the art, that the teachings of this disclosure are applicable in the design and manufacture of other types of optical instruments.

It is believed that the binocular body as an article of manufacture, has certain characteristics, aside from the facility of manufacture and economy of material quantity used, which provide an article of highly improved character, one of such characteristic is the resilient yet rugged construction achieved by the use of pressed-metal such as steel in each of the complete body portions comprising the binocular. Such resilience is inherent in pressed-metal assemblies and renders the binocular assembly less likely to damage or unfitness for use due to misalignment of the body portion resulting from dropping of the binocular or its being subjected to large twisting loads which may quite frequently be the case, particularly in military use. In short a considerably larger amount of rough handling of the binocular having a pressed-metal body may take place without causing misalignment than is possible with binoculars having body portions or members of cast material. This statement assumes, of course, similar material weights or sections.

Another such characteristic is the structural strength achieved by the specific hinge mounting to the binocular body members, which is very evident upon an inspection of this construction. The particular construction prevents a concentration of forces or stresses in the body members due to loading of the hinge members in bending as may be caused by twisting of the instrument in the plane of the hinge, due to loading of the instrument in either tension or compression transversely of the hinge axis and due to force couples axially of the hinge axis. In any of the above-mentioned conditions a distribution of forces is obtained which, in part, because of the hinge member mounting and, in part, due to the inherent resilience of the pressed-metal body members, obviates a stress condition in excess of the elastic limit of the body material which would result in a permanent misalignment of the body members, except, of course, under the most severe conditions.

Accordingly in its broadest aspect it is a principal object of the present invention to provide an optical instrument having a body or barrel construction in which structural strength is an inherent characteristic.

Another object of the present invention is to provide a body or barrel construction for a prismatic binocular or other optical instrument which is formed of pressed-metal.

A still further object is to provide a design wherein relatively simple stampings are required, thereby providing for a maximum precision in forming the parts, as well as maximum facility in setting up the metals so that they will remain permanently in alignment and position.

A specific object of the present invention is to provide a pressed-metal body or barrel construction for a binocular or other optical instrument in which the body or barrel is formed in two halves and flanged longitudinally for the purpose of providing joining surfaces and stiffening the assembled halves.

Another specific object of the present invention is to provide a prismatic binocular in which the hinge members are secured to the body or barrel members in a manner to effect a distribution of stresses.

Other objects and advantages will become apparent upon a study of the following specification when considered in conjunction with the accompanying drawings in which:

Figure 1 is a sectional view of the assembled binocular body or barrel members constructed in accordance with the teachings of this invention. The sectional view being taken in the plane of the section indicated on Fig. 2. The eyepiece and objective lenses, and the prism assembly are indicated in their respective positions in dot-dash outline, Fig. 2 is a view looking into the eyepiece end of the assembled binocular body members, Fig. 3 is a view looking into the eyepiece end of the assembled right hand body member and having the front cover plate removed, Fig. 4 is a bottom plan view of the assembly illustrated in Fig. 3, Fig. 5 is a sectional view taken on the line V—V of Fig. 4, and Fig. 6 is a sectional view taken on the line VI—VI of Fig. 3.

Figure 2:
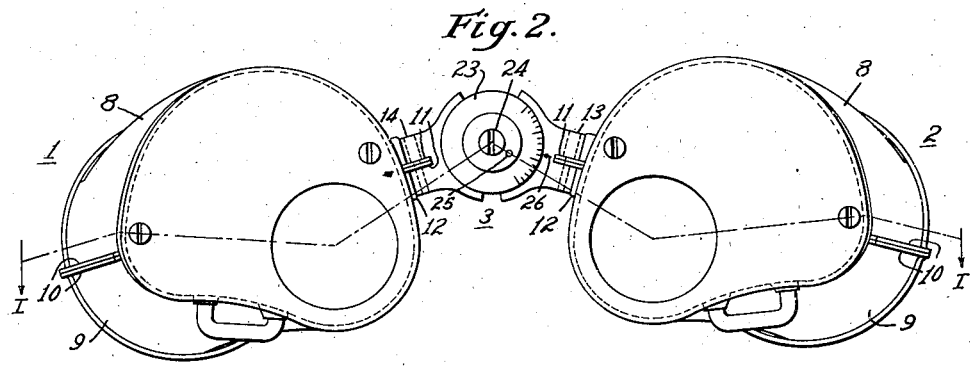

Referring now to Figs. 1 and 2 the assembled binocular comprises the left and right hand body or barrel members 1 and 2 respectively which are pivotally secured together by the binocular hinge assembly generally denoted by the reference character 3. It will be noted in Figs. 1 and 2 that the showing made is directed primarily to the construction and hinging of the body or barrel members and that such elements as the eyepiece assembly 4, the objective assembly 5, the prism assembly 6 and the reticle assembly 7 are illustrated only in dot-dash outline. This has been done for the purpose of clearness since these assemblies of themselves are of complicated construction and their detailed inclusion in the drawings would only complicate the illustrations with unnecessary details. By outlining these assemblies their respective positions and means of support in the body or barrel members are shown which for the purpose of this invention is deemed sufficient.

Each body or barrel member comprises a top half 8 and a bottom half 9 which are formed of pressed-metal, preferably steel, and are provided with outside flanges 10 and inside flanges 11 extending longitudinally of the body for the purpose of providing suitable joining surfaces and also to function as stiffening ribs. The flanges 11 on the inside or hinge side of the body are considerably wider than the outside flanges 10. The body halves 8 and 9, over that portion of their length included within the hinge mounting thereto, are provided with offset or embossed portions 12 which form a plane surface at right angles to the flanges 11 and additionally stiffen the body in the region of the hinge mounting.

The hinge 3 comprises the two pairs of hinge lugs 13 and 14 which as seen in Fig. 1 are reduced to half their normal or body thickness and positioned in overlapping pivotal engagement. Each lug at its body engaging extremity is slotted for a portion of its length to receive in such slot the flanges 11 with the extremity of the lugs abutting the surface of the offset surface 12 of the body or barrel. Figs. 3, 4 and 5 clearly illustrate this particular mounting. When properly secured it will be seen that a very secure hinge lug mounting is provided and that further by reason of the particular body configuration provided by the offset or embossed portion 12 and the flanges 11 that a distribution of stresses in the body is obtained. This will be better understood by a comparison of this mounting with one in which the hinge lugs merely abut the surface of a body which is not offset and flanged in the manner shown. With this type of construction any stresses would be concentrated at the base of the hinge lug and the body would be much more readily deformed because of this stress concentration. With the particular body configuration shown the stresses are distributed throughout the offset body portion and the flange and are thus transmitted to the body proper over a considerably larger area. Such area being largely defined by the area of the offset 12. It will further be noted that the expedient of inserting the flanged surface 11 into slots in the base of the hinge lugs 13 and 14 provides additional structural strength particularly with respect to transverse loading of the hinges and with respect to forces acting axially of the hinge axis. Regarding the transverse forces it will be seen in Fig. 4 that the flanges 12 by reason of their extending throughout the length of the body or barrel, distribute stresses caused by such loads throughout the length of the body and in a similar manner with respect to the axial forces prevent a concentration of stresses at any one point. In short, the joining of the flanges 12 provides in effect a rib member which functions in a manner similar to a beam. Its laminated construction providing structural strength far greater than that of an equivalent solid section.

The specific hinge construction while shown in some detail in the drawings forms no part of the present invention and is provided among other reasons for the purpose of completeness. It is also believed that the presentation of such details will provide an appreciation of the need for accuracy in the construction of such optical instruments whereby an understanding of the specific manufacturing process to be hereinafter described will be more readily had.

The hinge 3 comprises an internally tapered bushing 15 which is provided with a flange 16 at one end, and which is secured within suitable bores in the extremities of the lugs 13 by means of pins 17 extending through the flange 16 into the lug 13, to prevent rotation, and the flanged over portion 18 engaging the opposite lug 13, to prevent axial movement. A cooperating externally tapered axle member 19 disposed within the bushing 15 engages the lugs 14 and is secured against rotative movement with respect to the lugs 14 by means of the pin 20, which acts as a key. This axle member is adjusted axially of the bushing 15 by means of the cap screws 21 and 22, which threadedly engage the internally threaded extremities of the axle to vary the pressure of engagement between the cooperating tapered surfaces of the axle 19 and the bushing 15. Since the axle is engaged with the lug members 14 secured to the body or barrel 1 and the bushing 15 is secured to the body or barrel 2, the pressure of engagement of the cooperating tapered surfaces determines the stiffness of the hinge and may be adjusted to any suitable value of stiffness by means of the cap screws 21 and 22. A suitable circular scale 23 marked in degrees or otherwise suitably marked in interpupillary distances is secured to the lug 14 through the cap screw 22 by means of the screw 24 and the pin 25. A cooperating marking or pointer 26 is provided on the lug 13 for indicating the position on the scale.

Each body or barrel assembly is provided with a substantially circular opening 27 which terminates in a shoulder 28 formed in the body. Within such opening is disposed an internally threaded ring or bushing 29 into which the objective lens assembly 5 is threaded. Similarly a bushing 31 (see Fig. 3), having an arcuate threaded portion somewhat greater than a semicircle, is provided in the opposite body extremity to have threaded therein the eyepiece lens assembly 4. The eyepiece lens assembly associated with the left-hand body or barrel member 1 being provided with the reticle assembly as shown at 7. The prisms 34 are positioned in the manner well known in the art upon a prism support or shelf 35. Such a prism assembly is accurately located and supported within each of the binocular body or barrel members by means of the three prism supporting lugs 36, 37 and 38, illustrated clearly in Figs. 3 and 5, which are secured internally of the body members. The respective positions of the cooperating prisms are accurately effected during the assembly of the prisms upon the shelf. It is a further necessary when mounting the prism assembly within the body member to provide an extremely accurate mounting for the shelf, otherwise the optical axis through the prism will not be coincident with the optical axis of the eyepiece and objective lenses. This, of course, can only be effected by an extremely accurate manufacturing process and will be described hereinafter in detail. Assuming for the moment, however, proper positioning of the lugs 36, 37 and 38, accurate positioning of the prism shelf on the lugs is accomplished by means of a pair of dowels (not shown) disposed on the prism shelf which engage the reamed holes 39 and 40 respectively in the lugs 36 and 37. The shelf is then secured at three points by means of screws passing therethrough and threadedly engaging the tapped holes 41, 42 and 43 provided in the lugs. The front cover plates 44, which are secured to the eyepiece extremities of each of the body members prior to the mounting of the eyepiece lens assembly 4, are secured by means of the screws 45, one of which screw threadedly engages a tapped hole 46 provided in the eyepiece bushing 31 and the other of which threads into the lug 47 secured within the body. Each of the body members is preferably coated with a vulcanized coating of hard rubber 48.

The hereinbefore described binocular body construction provides an inherently strong binocular. The strength feature resides primarily in the inherent resilience obtained by using the stamped metal bodies and the proper design and construction of the metal stamping. Further explanation regarding resilience in metal stampings is, of course, unnecessary since such characteristics are well known to the art. The design of metal stampings for maximum strength for a particular application, may be varied within given limits. In the instant application the completed stamped body assembly was required to be interchangeable with bodies of cast material used in formed constructions. To accomplish this it was, therefore, necessary to provide an external configuration of the stamped body which was substantially the same as that of the cast body and insert prism lugs, eyepiece and objective bushings in a manner to accommodate the standard optical elements and mount the hinges to achieve the predetermined interpupillary dimensions for given hinge angles. The design of the body configuration was, therefore, well defined by known requirements which had to be fairly rigidly adhered to. It was, therefore, necessary to consider the construction which, together with possible alterations in surface contour of the body to achieve strength, would provide the strongest body. The split body construction illustrated and hereinbefore described afforded the simplest and strongest arrangement since with this construction it was possible to provide the flanged portions 10 and 11 which when properly bonded together provide stiffening ribs longitudinally of the body. The ribs 11 in combination with the offset or embossed body portions 12 function additionally to provide a hinge mounting which has inherently great strength since stress concentrations in the body proper are obviated.

Binoculars are instruments of rather high complexity. To be useful as an optical instrument their two optical axes and the mechanical or hinge axis must remain in parallel relationship throughout the instrument's entire interpupillary range. To accomplish this end in the past it was found necessary to perform many operations by hand which resulted in a slow and laborious manufacturing procedure. The manufacturing process presently to be described provides such precision control of manufacturing and such a sequence of manufacturing operations that the finished product is inherently accurately aligned.

The advantages obtained by the use of pressed-metal constructions are, of course, well known and accepted. Some of the more important advantages are, minimum of machining required, minimum of material employed in a construction and maximum strength in relation to weight, if properly designed. The pressed-steel bodies now being made in accordance with the teachings of this disclosure are pressed from sheet steel the thickness of which is approximately one-third to one-fourth the cross-sectional thickness of the material, for example, in die-cast aluminum bodies. A comparison of the relative strength of two such bodies revealed that the pressed-steel body was the equivalent in structural strength of the die-cast aluminum body.

There are several methods of making the pressed-metal body or barrel members. Among these are the one-piece drawn body and the split body. Consideration of such problems as dimensional control in the stamping operation and facility of stamping resulted in the selection of the split body design. With the split body design a simpler and more direct solution to the specific stamping problem is achieved, since a better set-up of the material in the press operation is possible and a closer control of irregular shapes and contours is obtained by simplifying the stamping operation.

The split body design comprises four individual stampings for the complete binocular assembly, the two upper left and right-hand body halves 8 and the two lower left and right-hand body halves 9. For the purpose of simplicity the illustrations of Figs. 3 to 6 inclusive show only the right-hand body or barrel member 2 and the balance of this disclosure relating to the manufacturing process for the binocular bodies will, therefore, be understood in connection with the above-named illustrations. The descriptive material directed to such process, however, is equally applicable to the left-hand body member since this member is merely a reversal of the right-hand member.

The steps in the manufacturing process for the right and left-hand body members 1 and 2 are as follows:

1. Stamp the upper and lower body halves 8 and 9 providing in the stamping operation the stamped or embossed projections 49 in the flanges 10' and 11 as shown in Fig. 6, and the punched holes 49a in the cooperating flanges of the opposite body half for the purpose of aligning the body halves 8 and 9 for assembly.

2. Form and trim the flanges 50 and 50a on the eyepiece extremities of the body halves.

3. Trim the flanges defining the plane of the body division to the approximate dimensions illustrated at 10' and 11 in Figs. 4 and 6 and provide the hinge lug locating notches 51 in both upper and lower body halves.

4. Punch holes 52 and 53 in the upper body half 8 and hole 54 in the lower body half 9 for locating the prism suport lugs 36, 37 and 38 respectively; punch hole 55 for locating the front cover lug 47, punch holes 56 for locating the eyepiece bushing 31 and punch holes 57 in the flanges 11 for locating the hinge lugs 13 and 14.

5. Stake the prism shelf lugs in their respective positions, rivet the cover lug 47, the eyepiece bushing 31 and the hinge lugs in position and press the objective bushing in the circular opening 27.

6. Apply brazing material to all inserted lugs and bushings.

7. Place the body halves together with strips of ribbon-like or wire-like brazing material inserted between or adjacent the abutting surfaces of the flanges 10' and 11 and then weld or otherwise secure the body halves together.

8. Hydrogen-braze the body members by passing them through a hydrogen controlled furnace having a uniform heating and cooling cycle.

9. Thoroughly clean the brazed bodies and trim flange 10' to dimensions of flange 10 in Fig. 6 and remove excess brazing material.

10. Grind the objective and eyepiece ends parallel and to predetermined dimensions with respect to the hinge lugs.

11. Ream and counterbore hinge lugs 13 to receive bushing 15 and taper ream hinge lugs 14.

12. Mill mounting faces 58 of the prism support lugs 36, 37 and 38.

13. Profile mill prism support lugs 36, 37 and 38.

14. Drill holes 39, 40, 41, 42 and 43 in the prism support lugs.

15. Drill cover plate hole 46 in eyepiece bushing 31 and drill cover plate hole 59 in cover lug 47 in the eyepiece extremity of the body.

16. Bore objective bushings 29.

17. Bore eyepiece bushings 31.

18. Tap objective bushing 29.

19. Tap eyepiece bushing 31.

20. Bur and countersink prism shelf holes 39—43 inclusive.

21. Tap cover holes 46 and 59.

22. Tap prism shelf holes 41, 42 and 43.

23. Mill abutting hinge lug faces.

24. Clean and paint bodies and apply rubber covering 48; air dry and then vulcanize.

25. Insert axle bushing 15 in hinge lugs 13 and firmly secure and pin in position by upsetting axle extremity at 18 and pinning at 17.

26. Face off abutting hinge faces of lugs 13.

27. Position right and left-hand body members in their respective positions and with tapered ream, line ream the bushings 15 and hinge lugs 14.

28. Complete axle assembly.

29. Install prism assembly on the prism support lugs 36, 37 and 38, mount the front cover plate and cement at 60 (see Fig. 1) in position, and install objective and eyepiece assemblies.

30. Make collimating and optical adjustments.

It is believed that metal-pressing or stamping procedures are sufficiently well known and understood in the art to make a detailed description of the dies and machinery employed in such operations unnecessary. It should be noted, however, that the preferred stamping procedure, in the upper body halves, is to emboss the projections 49 during the forming or pressing of the upper body contours and to punch the holes 49a in the bottom flanges 10' and 11, which receive the embossed projections 49 for aligning the bodies, at the same time the lower body contours are formed. This insures an accurate and uniform location of the embossed portions 49 and the holes 49a. The flanges 50 and 50a on the eyepiece extremities of the upper and lower body halves may then be formed and trimmed in any desired suitable manner.

Prior to assembling or joining an upper and a lower body half together as noted in manufacturing process step number 7, thin strips of ribbon-like or wire-like brazing material are laminated between the abutting flange surfaces of the body halves. The body halves are then spot welded or otherwise suitably secured together. By providing the thin strips of brazing material between the abutting surfaces of the flanges 10' and 11 a controlled amount of brazing material is made available to these surfaces. The result is that a neat and secure joint is obtained after brazing.

The hinge lugs 13 and 14, prism shelf lugs 36, 37, 38, eyepiece bushing 31, coverplate lug 47 are preferably made of extruded bar having a cross-sectional configuration the same as the profile of the particular lug, hinge or bushing to be cut therefrom. Any one of these parts may therefore, be made by a simple cut-off operation. In a similar manner the objective bushings 29 are cut from tubular members.

Upon securing the various lugs and bushings to the pressed body members suitable quantities of brazing material are applied to each and the body or barrel members thus assembled are placed in a hydrogen controlled furnace where a uniform heating and cooling cycle takes place. Each of the bodies is thus brazed under uniformly controlled conditions of such character as to provide a minimum distortion of the product and, at the same time, provide maximum dimensional stability by thoroughly normalizing the stress components in the body. The finished product is, therefore, a uniformly strong, permanently sized, unit assembly having strength characteristics and uniformly accurate dimensions in a degree which is believed to be superior to that obtainable in a similar unit fabricated from one piece of steel, as hereinbefore mentioned, because of the manufacturing variations resulting from the more complicated stamping operation required and the inherent strains set up in this more difficult type of stamping.

The machining operations and the sequence of their performance as listed in steps 10 to 27 inclusive are very important. To obtain an accurately finished binocular it is necessary to faithfully follow the steps as outlined. The parallel grinding of the objective and eyepiece body extremities (step 10) must be accurately accomplished to insure parallel mounting of the objective and eyepiece lenses. Should other than a parallel relation exist future reaming and tapping operations, depending upon these surfaces for accuracy, will be in error and the optical axis of the objective lens may not be parallel with that of the eyepiece lens.

Inasmuch as the lugs and bushings are separate components brazed to the body of the binocular, their relative position is subjected to greater variation than the equivalent components of a die-cast body. All of the inserted lugs and bushings are, therefore, preferably made of noncorrosive material so that these elements may be machined after the brazing operation. Steps 12 and 13, namely, milling the mounting faces of and profile milling the prism support lugs, provides 100% control of the mounting lug edges with respect to the components which are mounted upon the prism shelf. Likewise the drilling and tapping operations performed on these members after brazing insure accurate location of the dowel holes and tapped holes in these members.

Operation number 27 in which the right and left-hand body members, with the bushing 15 secured in position on the hinge lugs 13, are relatively positioned and the bushing 15 and hinge lugs 14 line reamed, provides an extremely accurate control of the hinging of the body members. With this operation a positive parallel relationship between the optical axes and the mechanical or hinge axis is assured.

From the foregoing it is apparent that the present invention provides a binocular which is inherently strong and which by reason of its construction effects a measurable reduction in material and parts thus providing both economy and facility of manufacture.

The foregoing disclosure and the showings made in the drawings are merely illustrative of the principles of this invention and should not be interpreted in a limiting sense. The only limitations should be determined from the scope of the appended claims.

I claim as my invention:

1. As an article of manufacture, a binocular body assembly comprising a pair of body members, a hinge having a plurality of body engaging lugs for pivotally joining the bodies together, each of said body members comprising an upper and a lower half having flange portions extending longitudinally thereof, said body halves being joined along said flange portions, said lugs being provided with slots of sufficient depth in the body engaging extremities thereof for straddling and snugly engaging said flanges with the extremities of said lugs abutting the body members.

2. A binocular body member comprising a pair of sheet metal body forming members, each having longitudinal flanges along which said body members are joined and each having an externally protruding surface adjacent one of said flanges in a plane at an angle thereto, and hinge lugs provided with slots to straddle the joined flanges, secured to said joined flanges and protruding surfaces.

3. A binocular body member comprising, a pair of sheet-metal body forming halves, each having longitudinal flanges along which said body halves are joined and each having an externally protruding surface adjacent one of said flanges and in a plane at right angles thereto, and hinge lugs having slots therein for receiving the joined flanges which lugs are adapted to be secured to said joined flanges and protruding surfaces.

4. A binocular body member comprising a sheet metal upper body-forming member and a sheet metal lower body-forming member, each of said members having outwardly extending rib members disposed lengthwise thereof for providing joining surfaces, an externally projecting surface extending lengthwise of each of said body-forming members, adjacent a rib thereof, said body-forming members being disposed in mating relationship and joined along said joining surfaces, and hinge lugs each having a slot therein for receiving the joined ribs and supported on said body by said joined ribs and projecting surfaces.

5. A binocular body member comprising a sheet metal upper body-forming member and a sheet metal lower body-forming member, each of said members having outwardly extending rib members disposed lengthwise thereof for providing joining surfaces, an externally projecting body surface extending lengthwise of each of said body-forming members adjacent a rib thereof, said body-forming members being disposed in mating relationship and joined along said joining surfaces, and a pair of hinge lugs each having a slot therein for receiving the joined ribs and supported on said joined ribs and projecting body surfaces at the extremities of the projecting body surfaces.

6. A binocular body member comprising, in combination, a pair of sheet metal body forming members each having longitudinally extending flanges along which said bodies are joined and each having an externally projecting surface section adjacent one of said flanges in a plane at right angles thereto, hinge lugs supported upon the surfaces formed by the joined flanges and their adjacent surface sections, a bushing formed of an incomplete annulus secured at one longitudinal extremity of the assembled body member, a second bushing formed of a complete annulus secured at the other longitudinal extremity of the assembled body member, and a plurality of separate supporting members joined to said body member internally thereof and disposed such that selected surfaces of said supporting members define a single plane at right angles to the axes of said incomplete annulus and said complete annulus.

7. A binocular body assembly comprising, in combination, a pair of body members, each of said body members comprising a pair of body forming members of sheet metal having longitudinally extending flanges along which the body forming members are joined, each of said body forming members having an externally projecting surface section adjacent a flange thereof joined with a flange of the other body forming member, a hinge comprising a plurality of lugs joined with the body members on said flanges and externally projecting surface sections for pivotally joining the bodies, a bushing formed of an incomplete annulus secured in similar longitudinal extremities of each body member, a bushing formed of a complete annulus secured in the other longitudinal extremity of each body member, and a plurality of separate supporting members joined to each body member internally thereof and disposed such that selected surfaces of said supporting members define a single plane at right angles to the axes of said incomplete annulus and said complete annulus.

WILLIAM J. RUSSELL.